United States Patent [19]

Espey et al.

[11] Patent Number: 4,506,399

[45] Date of Patent: Mar. 26, 1985

[54] METHOD OF MAKING STRUT NUTS

[75] Inventors: Carl R. Espey, Fairview Park; Barney A. Andrews, Wadsworth, both of Ohio

[73] Assignee: Nuts, Incorporated, Seville, Ohio

[21] Appl. No.: 496,895

[22] Filed: May 23, 1983

[51] Int. Cl.³ .............................................. B21D 53/24
[52] U.S. Cl. .................................................... 10/86 R
[58] Field of Search ............ 10/75, 86 R, 86 A, 86 B, 10/86 CL; 411/184, 185, 186, 187, 188

[56] References Cited

U.S. PATENT DOCUMENTS

| 351,978 | 11/1886 | Hare | 10/86 A |
|---|---|---|---|
| 1,159,283 | 11/1915 | Sleeper | 10/86 A |
| 1,429,645 | 9/1922 | Schroeder | 10/86 R |
| 1,795,517 | 3/1931 | Sharp | 10/86 A |
| 3,049,161 | 8/1962 | Attwood | 411/81 |
| 4,377,360 | 3/1983 | Kennedy | 10/86 R X |

FOREIGN PATENT DOCUMENTS 462360  11/1913  France ................................. 10/86 R 50-6428  3/1975  Japan ................................. 10/86 R Primary Examiner—E. Michael Combs
Attorney, Agent, or Firm—Pearne, Gordon, Sessions, McCoy, Granger & Tilberry

[57] ABSTRACT

A method of making a nut adapted for use in combination with a structural member commonly known as "UNISTRUT". The structural member or "UNISTRUT" as in one face, a longitudinal slot bordered by inwardly projecting flanges. The nut has serrations in one face and is positioned in the slot with the serrations in gripping engagement with the edges of the flanges so that a threaded fasting member may extend between the flanges and into the threaded opening into the nut. In accordance with the method of the invention a strip of deformable, hardenable metal is cold rolled to form a plurality of longitudinally extending ridges or serrations and with sufficient force and working to harden the strip. The resulting hardened strip is then cut diagonally into a plurality of nut blanks with hardened serrations in one face. The blanks are then tapped to form a nut adapted for use in a "UNISTRUT" system.

1 Claim, 8 Drawing Figures

U.S. Patent  Mar. 26, 1985  4,506,399
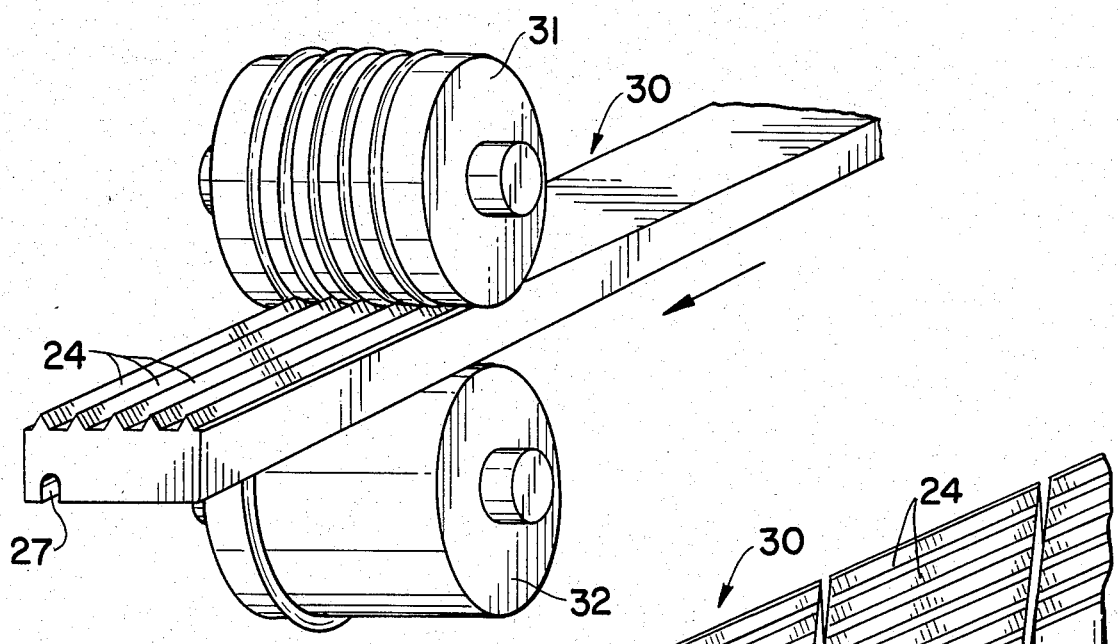
FIG. 1
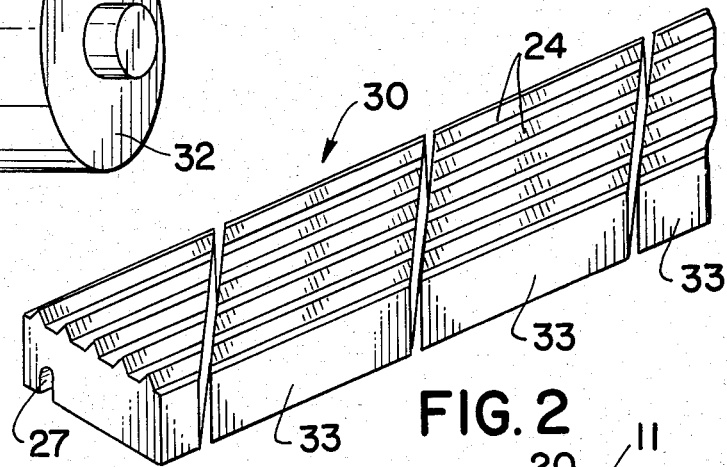
FIG. 2
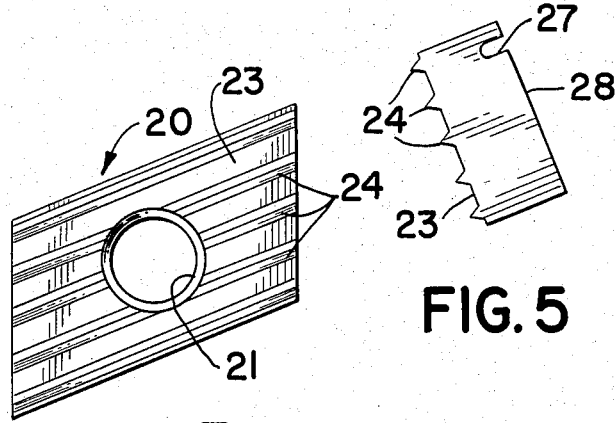
FIG. 5
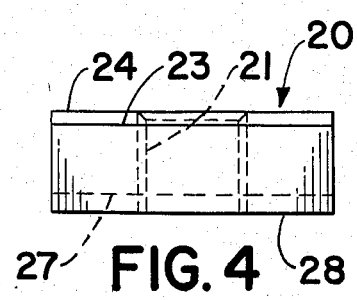
FIG. 3
FIG. 4
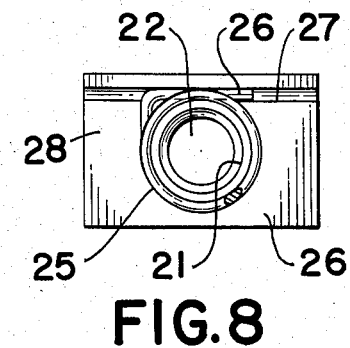
FIG. 8
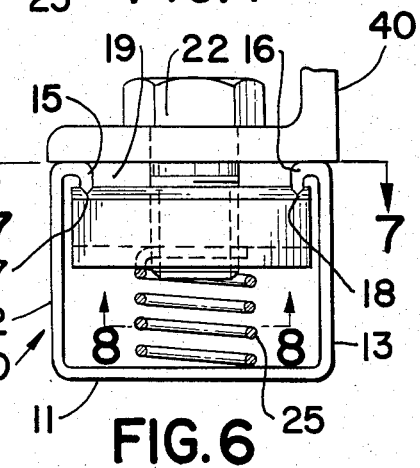
FIG. 7
FIG. 6

METHOD OF MAKING STRUT NUTS

BACKGROUND OF THE INVENTION

This invention relates to metal fasteners for use in the construction trade and especially to fasteners known as strut nuts that are used for fastening channels, brackets, upright supports and cross members in steel structures. More particularly the invention relates to a method for making strut nuts by which serrations for gripping a structural base are formed and the metal is worked to a desired hardness.

Strut nuts are constructed primarily for a specific use but are capable of some limited general uses as well. The specific use for which the nut is intended, is for securing fittings or other items to a structural product known in the trade as "UNISTRUT". This is a rectangular metal channel in which the edge portions of the "legs" or flanges of the channel are turned inwardly 180°. Thus the UNISTRUT has a rectangular cross section with one face having a slot of smaller width than the face itself and with a pair of inwardly projecting flanges defining the slot. The inwardly facing edges of the flanges are double beveled to present a sharp edge.

In the strut nut fastening assembly to which the invention relates a nut with biting portions formed in one face and generally a helical spring or the like in engagement with the opposite face, is slid along the UNISTRUT member to a desired location with the biting portions of the nut in engagement with the sharp edges of the UNISTRUT flanges. The helical spring urges the nut against the edges of the flanges to firmly locate the nut in its selected position. A threaded fastener may then be threaded into the nut to anchor other structure to the UNISTRUT member. Such nuts and the assembly thereof are shown in U.S. Pat. Nos. 3,049,161 and 3,050,355.

In the past strut nuts have been produced by (1) forming a tapped hole in a nut blank formed of mild steel, (2) cutting serrations or other biting portions in the one face and then (3) heat treating the resulting product to harden the serrations or other biting portions. This procedure requires expensive tooling and a costly heat treating step.

The method of the present invention avoids certain of the disadvantages indicated above and affords other features and advantages heretofore not obtainable.

SUMMARY OF THE INVENTION

It is the among the objects of the invention to manufacture strut nuts by means of a more economical and efficient manufacturing process.

Another object is to provide strut nuts with hardened serrations in one face thereof without employing a heat treating process.

These and other objects and advantages are accomplished by the method of the present invention which comprises as a first step, cold rolling a strip of deformable hardenable metal to form a plurality of longitudinally extending ridges, the cold rolling being accomplished with sufficient force and producing sufficient deformation (working) to harden the strip. The resulting cold rolled strip is then cut preferably on a diagonal to form a plurality of nut blanks with hardened serrations in one face. The nut blanks are then tapped to complete the manufacture of the strut nut.

In accordance with one aspect of the invention the cold rolling process includes rolling a small channel or slot, in the opposite face of the strip to provide an anchoring means for a helical spring that forms part of the strut nut assembly.

BRIEF DESCRIPTION OF THE DRAWINGS

FIG. 1 is a perspective view illustrating the initial step of the method of the invention;

FIG. 2 is a perspective view illustrating a subsequent step in accordance with the method of the invention;

FIG. 3 is a plan view of a strut nut produced in accordance with the method of the invention;

FIG. 4 is a front elevation of the strut nut of FIG. 3;

FIG. 5 is an end elevation of the strut nut of FIGS. 3 and 4;

FIG. 6 is an end elevation illustrating a strut nut produced in accordance with the method of the invention assembled with a UNISTRUT member for use in anchoring another structural member to the UNISTRUT member;

FIG. 7 is a sectional view taken along the line 7—7 of FIG. 6; and

FIG. 8 is a fragmentary sectional view taken along the line 8—8 of FIG. 6.

DESCRIPTION OF THE PREFERRED EMBODIMENT

Referring more particularly to the drawings and initially to FIGS. 6, 7 and 8 there is shown a structural member 10 known in the trade as UNISTRUT, illustrated in combination with a strut nut 20 made in accordance with the method of the invention. The strut nut 20 and related parts of the fastening assembly are used to attach a structural member 40 to the UNISTRUT member 10. The UNISTRUT member is essentially a metal channel having a web 11, and opposed side walls or flanges 12 and 13 to define a slot 14. The upper ends 15 and 16 of the side walls or flanges 12 and 13 are bent inwardly 180° (FIG. 6) and the edges 17 and 18 thereof are double beveled to present sharp inwardly facing edges 17 and 18. Thus, the upper face of the UNISTRUT defines an opening 19 into the slot 14 that has a smaller width than the width of the UNISTRUT.

As indicated in FIGS. 6 and 7 the strut nut 20 cooperates with the UNISTRUT member 10 to permit other structural members such as an angle bracket 40 to be attached to the UNISTRUT at a desired location.

The nut 20 has a threaded opening 21 formed therein adapted to receive a bolt 22 used to secure the bracket 40. The upper face 23 of the strut nut 20 as viewed in FIGS. 3, 4, 6 and 7 has a plurality of ridges or serrations 24 formed therein. These have sufficient hardness to provide a gripping function when assembled with the UNISTRUT member 10. The serrations 24 are adapted, as illustrated in FIGS. 6 and 7, to bear against the beveled edges 17 and 18 of the ends 15 and 16 to provide gripping engagement therewith.

In assembled relation a helical spring 25 bears between the base 11 and the bottom of the nut to urge the upper face 23 of the nut with the serrations 24 into engagement with the ends 15 and 16. The spring 25 permits the nut to be slid along the channel or slot 14 to a desired position. The spring 25 has a relatively straight leg 26 formed therein which is adapted to be received in a slot 27 formed in the bottom face 28 of the nut 20.

The shape and dimensions of the nut 20 are such that it can be oriented to fit through the opening 19 and then rotated about 70° to lock it in the slot in the position shown in FIGS. 6 and 7.

In accordance with the method of the invention the strut nut 20 is produced in such a way that no special heat treating is required to produce the desired hardness. The method includes the initial step (FIG. 1) of passing a length of bar stock 30 between cold rolls 31 and 32 in a manner that produces sufficient deformation (working) that a desired hardness results. The top roll 31 produces the ridges or serrations 24 while the backing roll 32 produces the slot 27 for the leg 26 of the helical spring. The resulting product is then cut preferably diagonally as illustrated in FIG. 2 to form individual nut blanks 33. The nut blanks are then tapped to complete the nut 20 as best illustrated in FIGS. 3, 4 and 5.

The method thus described eliminates any need to heat treat the resulting strut nuts because the forces required to roll the bar stock 30 to form the serrations 24 are so great that a cold working effect takes places and the need for an additional heat treat is eliminated.

While the invention has been shown and described with respect to a specific embodiment thereof this is intended for the purpose of illustration rather than limitation and other variations and modifications of the specific method herein shown and described will be apparent to those skilled in the art all within the intended spirit and scope of the invention. Accordingly the patent is not to be limited in scope and effect to the specific method herein shown and described nor in any other way that is inconsistent with the extent to which the progress in the art has been advanced by the invention.

What is claimed is:

1. A method for making a nut adapted for use in combination with a structural member having in one face a longitudinal slot bordered by inwardly projecting flanges, the nut being adapted to be positioned in the slot with portions thereof in gripping engagement with the ends of said flanges and being adapted to receive an externally threaded fastening member, comprising the steps of:

cold rolling a strip of deformable hardenable metal to form a plurality of longitudinally extending parallel ridges and grooves, each ridge defining a relatively sharp edge along the top thereof, said rolling producing sufficient force and deformation to harden said strip;

cutting the resulting cold rolled strip diagonally thereacross at uniformly spaced locations to form a plurality of rhomboid-shaped nut blanks with parallel hardened serrations on one face; and tapping the resulting nut blanks to form a nut.

* * * * *